(12) United States Patent
Cohen et al.

(10) Patent No.: US 9,911,967 B2
(45) Date of Patent: Mar. 6, 2018

(54) FILLING DEVICE FOR FIREFIGHTERS OF A DRIVE BATTERY OF AN ELECTRIC OR HYBRID VEHICLE

(71) Applicant: RENAULT s.a.s., Boulogne-Billancourt (FR)

(72) Inventors: Jonathan Cohen, Issy-les-Moulineaux (FR); Gilles Mulato, Chatillon (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 790 days.

(21) Appl. No.: 14/374,973

(22) PCT Filed: Mar. 1, 2013

(86) PCT No.: PCT/FR2013/050442
§ 371 (c)(1),
(2) Date: Oct. 30, 2014

(87) PCT Pub. No.: WO2013/128143
PCT Pub. Date: Sep. 6, 2013

(65) Prior Publication Data
US 2015/0056481 A1  Feb. 26, 2015

(30) Foreign Application Priority Data
Mar. 2, 2012  (FR) ..................... 12 51921

(51) Int. Cl.
*H01M 2/36*  (2006.01)
*H01M 2/10*  (2006.01)
(Continued)

(52) U.S. Cl.
CPC ............. *H01M 2/362* (2013.01); *B60K 1/04* (2013.01); *B60L 11/1874* (2013.01);
(Continued)

(58) Field of Classification Search
None
See application file for complete search history.

(56) References Cited

U.S. PATENT DOCUMENTS

2010/0250041 A1* 9/2010 Li ........................... B60K 6/48
701/22

FOREIGN PATENT DOCUMENTS

DE  10 2008 059 948  6/2010

OTHER PUBLICATIONS

DE102008059948A1 Original and Translation from Espacenet.*
(Continued)

*Primary Examiner* — Barbara L Gilliam
*Assistant Examiner* — Nathaniel T Zemui
(74) *Attorney, Agent, or Firm* — Oblon, McClelland, Maier & Neustadt, L.L.P.

(57) ABSTRACT

An electric or hybrid vehicle including an arrangement of mechanisms introducing an extinguishing fluid into a battery pack, especially a drive battery, of the vehicle. A first port is placed in a wall of the pack and provides access to an interior of the pack, the first port including a partial or total blocking mechanism being removable or meltable under effect of temperature. A second port is placed in an element of a body of the vehicle facing the first port. Extinguishing fluid may be introduced into the pack through two ports once the blocking mechanism of the first port has been removed or melted.

20 Claims, 2 Drawing Sheets

(51) Int. Cl.
*H01M 10/42* (2006.01)
*B60K 1/04* (2006.01)
*B60L 11/18* (2006.01)
A62C 3/07 (2006.01)
A62C 3/16 (2006.01)
B62D 25/20 (2006.01)

(52) U.S. Cl.
CPC ....... *B60L 11/1877* (2013.01); *B60L 11/1879* (2013.01); *H01M 2/1077* (2013.01); *H01M 2/365* (2013.01); *H01M 10/42* (2013.01); A62C 3/07 (2013.01); A62C 3/16 (2013.01); B60L 2240/545 (2013.01); B62D 25/20 (2013.01); H01M 2200/00 (2013.01); H01M 2200/10 (2013.01); H01M 2220/20 (2013.01); Y02T 10/705 (2013.01); Y02T 10/7011 (2013.01)

(56) References Cited

OTHER PUBLICATIONS

International Search Report dated Jul. 16, 2013 in PCT/FR13/050442 Filed Mar. 1, 2013.
French Search Report dated Nov. 19, 2012 in French Patent Application No. 1251921 Filed Mar. 2, 2012.

* cited by examiner

FILLING DEVICE FOR FIREFIGHTERS OF A DRIVE BATTERY OF AN ELECTRIC OR HYBRID VEHICLE

BACKGROUND

The present invention relates to a vehicle having an arrangement of means enabling firefighters to fill a traction battery of said vehicle, notably with an extinguishing fluid such as water. It is notably, but not exclusively, applicable to lithium-ion (Li-ion) batteries supplying the powertrains of electric or hybrid vehicles.

Because of their high voltage and high energy density, Li-ion batteries are particularly suitable for supplying the powertrain of an electric or hybrid vehicle. In a battery of this type, an Li-ion cell is an elementary component containing a certain quantity of electrolyte, which may be a solid or liquid electrolyte, through which lithium ions can migrate between a cathode and an anode, in order to store or deliver electrical energy. A plurality of Li-ion cells are initially assembled and connected in series and/or in parallel to form a module, after which a plurality of modules are assembled and connected in series and/or in parallel to form a pack.

In view of the many safety devices used by the applicant to prevent and forestall voltage overloads at the terminals of electrochemical cells, it is extremely unlikely that the contents of a pack will catch fire spontaneously. However, if a fire occurs in the vehicle as a whole, regardless of whether this fire is due to a traffic accident or caused by an act of vandalism, the very high evolution of heat in the proximity of the pack may trigger a phenomenon of thermal runaway inside the electrochemical cells. The cells may then, in turn, catch fire within the pack, as soon as they exceed a temperature threshold. Since this is a fire of chemical origin, it is very difficult to extinguish, especially as it is confined within the enclosure formed by the pack.

Indeed, the packs used at the present time are virtually hermetically sealed, notably if they are fitted with a cooling circuit for the circulation of a heat transfer fluid in the pack. This is the case, for example, with packs placed inside the vehicle in a poorly ventilated compartment. Only the inlets and outlets of the cooling circuit allow access to the inside of the pack via small openings, access to which is difficult or even uncertain, especially after a vehicle fire.

Other packs, notably those placed in vehicles with particularly well-ventilated battery locations, for example those placed flat on the outside under the body of the vehicle as in a Kangoo ZE vehicle (trademark registered by the applicant), have no cooling circuit, but are provided with valves to prevent overpressure within the pack. In this case also, the openings left by the valves after a fire in the vehicle are small, and access to them is difficult, or even impossible, in certain architectures.

BRIEF SUMMARY

One object of the invention is, notably, to allow access to the inside of the battery pack of a vehicle on fire, so as to enable firefighters to flood its electrochemical cells with a large quantity of water. The invention therefore proposes a vehicle having a battery pack, notably a traction battery pack. A first port is positioned on a wall of the pack and gives access to the inside of the pack. The port has total or partial blocking means, these means being removable or meltable under the effect of heat. A second port positioned on a member of the body of the vehicle facing the first port, in such a way that the second port gives access to the first port. An extinguishing fluid may be introduced into the pack through the two ports as soon as the blocking means of the first port have been removed or have melted.

In one embodiment, the blocking means of the first port may include an area of reduced thickness of the wall of the pack, this area being breakable by mechanical action.

In another embodiment, the blocking means of the first port may include a blocking piece composed at least partially of a material which is meltable under the effect of heat, and the blocking piece may advantageously include a valve or a coupling sleeve.

Advantageously, the second port may include a grating isolating the inside of the body from electromagnetic disturbances emitted from the first port, while allowing the extinguishing fluid to pass through. For example, the grating may be incorporated in the sheet metal stamping die for the body.

Preferably, the second port may also include blocking means which are removable or meltable under the effect of heat, for example a fusible soundproofing sheet.

In an advantageous embodiment, the battery may be placed under the trunk of the vehicle, while the first port may be positioned on top of the pack and the second port may be positioned on the floor of the trunk, facing the first port.

The principal advantage of the present invention is that it is simple and inexpensive to use if it is taken into consideration at the time of the design of the vehicle.

BRIEF DESCRIPTION OF THE DRAWINGS

Other characteristics and advantages of the invention will become apparent from the following description provided with reference to the attached FIGS. 1a, 1b, 1c, 2a, 2b and 2c, which show, in different views, an exemplary embodiment of the invention on a Kangoo ZE (trademark registered by the applicant) utility vehicle.

DETAILED DESCRIPTION

Figure 1A:
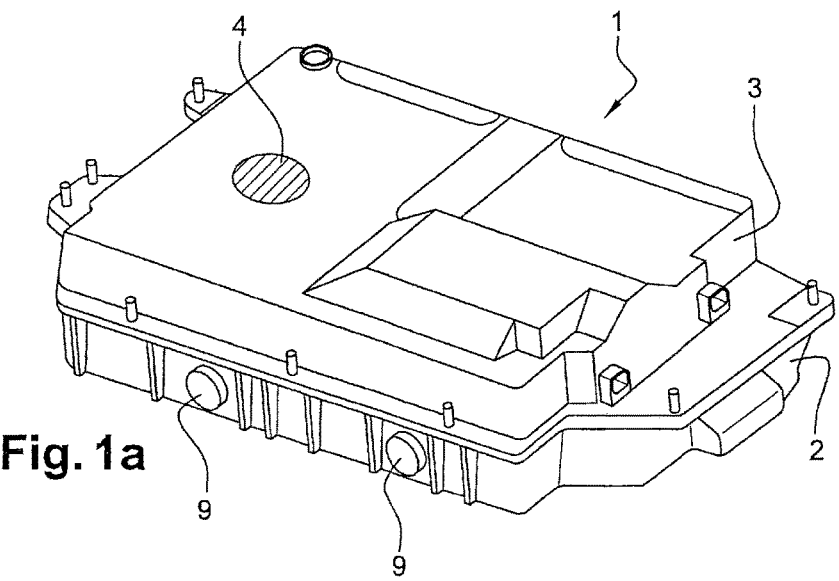
Figure 1B:
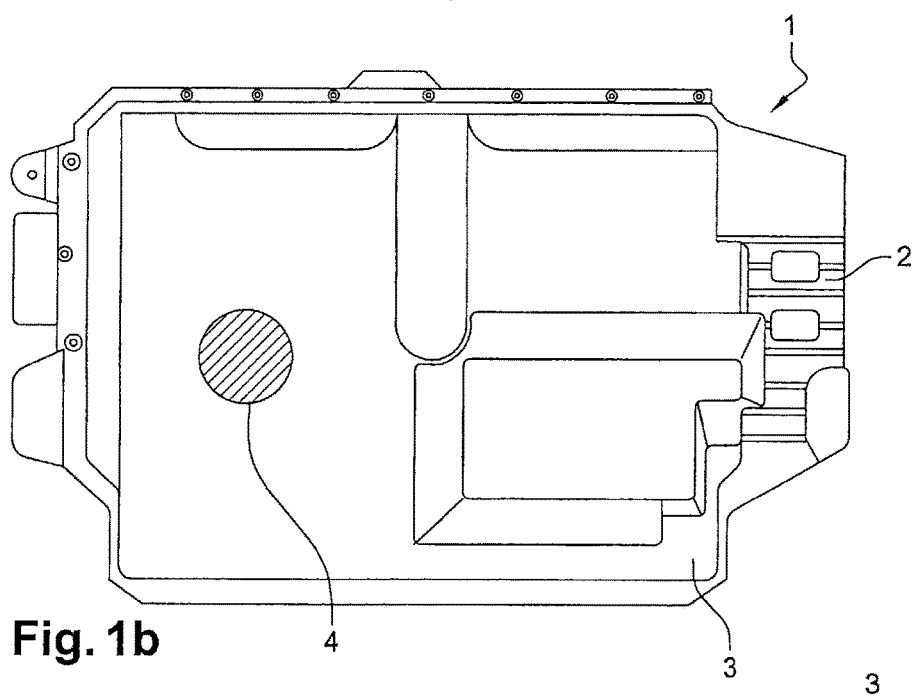

FIGS. 1a and 1b show, in a perspective view and in a view from above respectively, a pack 1 for this type of vehicle. The pack 1 is essentially formed by an aluminum base 2, sealed by a cover 3 which is also made of aluminum. The base 2 includes two valves 9 for maintaining a pressure equilibrium between the inside of the pack 1 and the outside. The pack 1 contains all the elements required to store electrical energy, namely two modules of 24 interconnected electrochemical cells, as well as all the elements required for their connection into the traction circuit of the vehicle, none of these elements being shown in the figures. The pack 1 also contains electronic control and safety components, notably a battery management system (BMS). According to the present invention, a first port 4 is positioned on top of the cover 3, thus providing access to the inside of the pack 1 for the introduction of a pressurized extinguishing fluid, for example water, into the pack 1. The port 4 may, for example, be substantially in the shape of a disk with a diameter of several centimeters.

In the present application, and as shown by the following exemplary embodiments, the term "port" is to be interpreted in a non-restrictive manner as including any type of opening provided with blocking means.

Figure 1C:
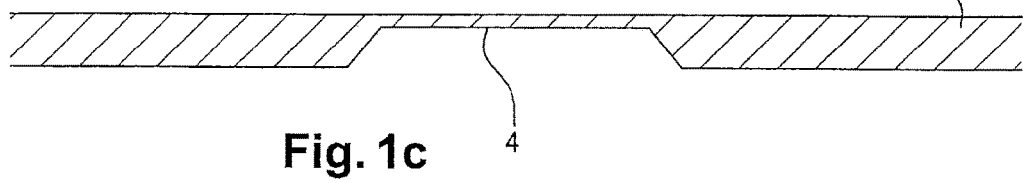

Thus, FIG. 1c shows, in a sectional view, an embodiment of the invention in which the port 4 may be formed by a local reduction in the thickness of the cover 3. This reduction in thickness forms a blocking piece for the port 4, this blocking piece being sufficiently weak to be broken locally by simple mechanical action with a tool such as a hammer, thus giving access to the inside of the pack 1 for the introduction of a pressurized extinguishing fluid into the pack 1.

In another embodiment, the port 4 could also be formed by a circular hole pierced in the cover 3, this hole being blockable by a blocking piece formed at least partially by a material which can melt under the effect of heat in the event of a fire, such as plastic for example, thus giving access to the inside of the pack 1 for the introduction of a pressurized extinguishing fluid into the pack 1. For example, a plastic material melting at 300° C. may be chosen.

It is evident from the aforementioned exemplary embodiments that the blocking means of the port 4 may be of different kinds. They may be, notably, dedicated to the purpose of blocking, in which case they provide total blocking of the port 4 as in the preceding two exemplary embodiments, in which the port 4 is sealed virtually hermetically. In other embodiments of the invention, however, the blocking means of the port 4 may also have additional functions. Thus the plastic blocking piece may, for example, function as a valve in place of the valves 9, or may function as a coupling sleeve for the circulation of a cooling fluid in the pack 1, in which cases the blocking means provide only partial blocking, the air or the cooling fluid being able to pass through the valve or the sleeve respectively.

Figure 2A:
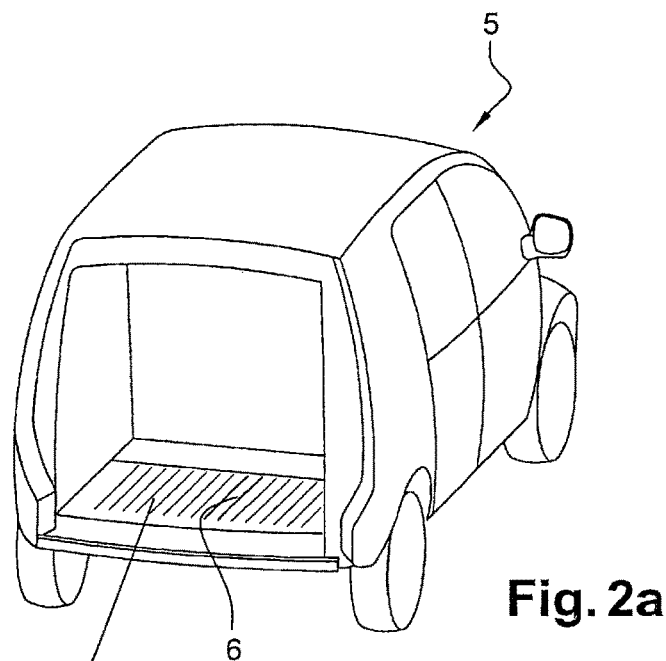
Figure 2B:
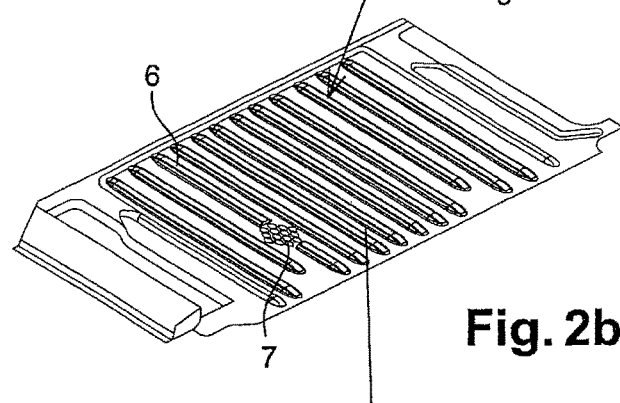
Figure 2C:
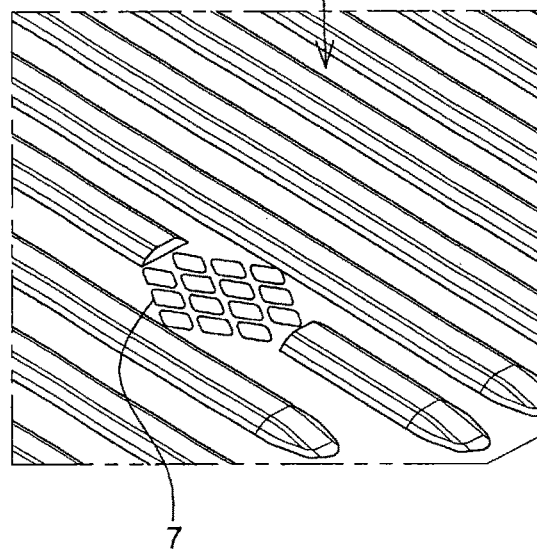

FIGS. 2a, 2b and 2c show, in perspective views, the body of a Kangoo ZE (trademark registered by the applicant) utility vehicle in which the floor 6 of the storage trunk includes a second port 7 positioned facing the first port 4, the pack 1 including the port 4 not being visible in the figures because it is placed under the body of the vehicle 5. When positioned in this way, the port 7 provides access to the port 4 and therefore to the inside of the pack 1, for the introduction of a pressurized extinguishing fluid into the pack 1. In the exemplary embodiment of FIGS. 2a, 2b and 2c, the port 7 may include a grating, since this grating does not prevent the passage of the extinguishing fluid.

In the exemplary embodiment of FIGS. 2a, 2b and 2c, the port 7 is actually formed by a plurality of contiguous holes pierced in the body, and the piercing of this grating may be incorporated into the sheet metal stamping die for the body. This is because, on the one hand, the execution is simpler if the stress is allowed for in advance of the project, using known methods, and this makes it possible to maintain the structuring reinforcing geometries of the vehicle, notably the stiffening ribs of the body. On the other hand, a plurality of holes in the body of the vehicle 5 instead of a single hole provides better physical protection against loading stresses, notably in the case of a utility vehicle.

Advantageously, the grating may act as isolation against electromagnetic disturbances emitted by the electrochemical cells through the blocking piece of the port 4 in the direction of the port 7, without thereby preventing the introduction of a pressurized extinguishing fluid. It should be noted that, in the case of a first port 4 whose blocking piece is formed by a local reduction in the thickness of the cover, a second port 7 including a grating is neither useful nor compatible. It is not useful, because a port whose blocking piece is formed by a local reduction in the thickness of the cover intrinsically acts as isolation against electromagnetic disturbances. It is not compatible, because the grating would prevent the application of mechanical action for locally breaking the blocking piece. The port 7 including a grating is therefore preferred if the port 4 is formed by a circular hole blocked by a blocking piece of plastic material. If the blocking piece of the port 4 is formed by a local reduction in the thickness of the cover 3, then the port 7 may be formed by a single circular hole with a diameter of the order of several centimeters, thus allowing the application of mechanical action, with a hammer for example, for the purpose of locally breaking the blocking piece of the port 4.

Also advantageously, the port 7, whether or not it includes a grating, may be blocked by a layer of surface protection which is subsequently painted, such as a fusible soundproofing sheet, this layer not being shown in the figures, which may protect the trunk of the vehicle 5 from any ingress of liquids, dust, or any foreign bodies. This layer, which has very small overall dimensions and is very inexpensive, can melt under the effect of heat in the event of a fire, thus freeing access to the port 7. For example, a layer melting at 300° C. may be chosen.

It should be noted that the present invention can be used equally easily in a conventional vehicle as in a utility vehicle, since the seats and other interior fittings will disappear under the effect of fire and heat, thus freeing the second port, regardless of its location on the body.

The invention not only allows firefighters to flood the electrochemical cells very rapidly with a large quantity of water, but has the principal advantage that it is inexpensive to use if it is taken into consideration at the time of the design of the vehicle, as the invention requires only the use of tried and tested methods.

The invention claimed is:

1. An electric or hybrid vehicle comprising:
a battery pack;
a first port positioned on a wall of the battery pack and that gives access to an inside of the battery pack, the first port including total or partial blocking means, which is removable or meltable under effect of heat; and
a second port positioned on a member of a body of the vehicle facing the first port, such that the second port gives access to the first port;
an extinguishing fluid being introducible into the battery pack through the first and second ports as soon as the blocking means of the first port has been removed or has melted,
wherein the second port includes a grating, the grating isolating an inside of the body from electromagnetic disturbances emitted from the first port, while allowing the extinguishing fluid to pass through.

2. An electric or hybrid vehicle comprising:
a battery pack;
a first port positioned on a wall of the battery pack and that gives access to an inside of the battery pack, the first port including total or partial blocking means, which is removable or meltable under effect of heat; and
a second port positioned on a member of a body of the vehicle facing the first port, such that the second port gives access to the first port;
an extinguishing fluid being introducible into the battery pack through the first and second ports as soon as the blocking means of the first port has been removed or has melted,
wherein the battery pack is placed under a trunk of the electric or hybrid vehicle, and the first port is positioned on top of the battery pack and the second port is positioned on a floor of the trunk, facing the first port.

3. The electric or hybrid vehicle as claimed in claim 1, wherein the blocking means of the first port includes a blocking piece composed at least partially of a material which is meltable under effect of heat.

4. The electric or hybrid vehicle as claimed in claim 3, wherein the blocking piece includes a valve.

5. The electric or hybrid vehicle as claimed in claim 3, wherein the blocking piece includes a coupling sleeve.

6. The electric or hybrid vehicle as claimed in claim 2, wherein the second port includes a grating, the grating isolating an inside of the body from electromagnetic disturbances emitted from the first port, while allowing the extinguishing fluid to pass through.

7. The electric or hybrid vehicle as claimed in claim 1, wherein the grating is incorporated in a sheet metal stamping die for the body.

8. The electric or hybrid vehicle as claimed in claim 1, wherein the second port includes second blocking means which are removable or meltable under effect of heat.

9. The electric or hybrid vehicle as claimed in claim 8, wherein the second blocking means of the second port includes a fusible soundproofing sheet.

10. The electric or hybrid vehicle as claimed in claim 1, wherein the battery pack is placed under a trunk of the electric or hybrid vehicle, and the first port is positioned on top of the battery pack and the second port is positioned on a floor of the trunk, facing the first port.

11. The electric or hybrid vehicle as claimed in claim 2, wherein the blocking means of the first port includes an area of reduced thickness of the wall of the battery pack, the area being breakable by mechanical action.

12. The electric or hybrid vehicle as claimed in claim 2, wherein the blocking means of the first port includes a blocking piece composed at least partially of a material which is meltable under effect of heat.

13. The electric or hybrid vehicle as claimed in claim 12, wherein the blocking piece includes a valve.

14. The electric or hybrid vehicle as claimed in claim 12, wherein the blocking piece includes a coupling sleeve.

15. The electric or hybrid vehicle as claimed in claim 11, wherein the second port includes second blocking means which are removable or meltable under effect of heat.

16. The electric or hybrid vehicle as claimed in claim 15, wherein the second blocking means of the second port includes a fusible soundproofing sheet.

17. An electric or hybrid vehicle comprising:
a battery pack;
a first port positioned on a wall of the battery pack and that gives access to an inside of the battery pack, the first port including total or partial blocking means, which is removable or meltable under effect of heat; and
a second port positioned on a member of a body of the vehicle facing the first port, such that the second port gives access to the first port;
an extinguishing fluid being introducible into the battery pack through the first and second ports as soon as the blocking means of the first port has been removed or has melted,
wherein the second port includes second blocking means which are removable or meltable under effect of heat.

18. The electric or hybrid vehicle as claimed in claim 17, wherein the second blocking means of the second port includes a fusible soundproofing sheet.

19. The electric or hybrid vehicle as claimed in claim 17, wherein the blocking means of the first port includes a blocking piece composed at least partially of a material which is meltable under effect of heat.

20. The electric or hybrid vehicle as claimed in claim 19, wherein the blocking piece includes a valve or a coupling sleeve.

* * * * *